Patented June 30, 1953

2,644,013

UNITED STATES PATENT OFFICE 2,644,013

PROCESS OF PRODUCING POLYHYDRIC ALCOHOL ETHERS FROM HEMIFORMALS AND CARBONYL COMPOUNDS

Robert H. Barth, Ridgewood, N. J., assignor to Heyden Chemical Corporation, New York, N. Y., a corporation of Delaware No Drawing. Application December 8, 1948, Serial No. 64,262

15 Claims. (Cl. 260—615)

My invention relates particularly to a process for producing polyhydric alcohol ethers and their derivatives. Furthermore, this invention has relation to a process for the preparation of mixed ethers of polyhydric alcohols. By such mixed ethers are meant, for instance, compounds of the formula R.O.R' in which R is a polyhydroxyalkyl radical and R' an alkyl group which may or may not contain hydroxyl groups. The preparation of these compounds may be accomplished by the reaction of hemi-formals, formed by the reaction of alcohols and formaldehyde, with certain carbonyl compounds.

In the said reaction, which is carried out under alkaline conditions, any of the alcohols, such for instance as methanol, ethanol, n-propanol, isopropanol, n-butanol, teritary-butanol, n-amyl alcohol, allyl alcohol, ethylene glycol, glycerol triethanolamine, methyl cellulose and soluble starch and any of the carbonyl compounds, such for instance as acetaldehyde, propionaldehyde, isobutyraldehyde and acetone may be used.

While my invention is capable of being carried out in many different ways, for the purpose of illustration I have described in detail hereinafter only certain examples thereof, the percentages and parts therein mentioned being by weight.

EXAMPLES OF THE INVENTION

1. Reaction of methanol hemiformal with acetaldehyde

A. A hemiformal, such as CH₃OCH₂OH, solution is prepared by adding 1 mole (117 parts by weight) of 25.7% formaldehyde solution in methanol to a mixture of 2 moles (64 parts) of methanol in 3.5 moles (420 parts) of a 30% aqueous sodium hydroxide. Two moles (88 parts) of acetaldehyde and 9 moles (1055 parts) of 25.7% formaldehyde in methanol are mixed at 10° and added to the hemiformal solution obtained as above. After ten minutes stirring, the reaction mixture is heated to 50–55° C. and refluxed at this temperature until the formaldehyde concentration has fallen below 0.95%. The mixture is then neutralized with 80% formic acid in water and allowed to stand overnight before it is filtered. The filtrate is concentrated under a vacuum of 20–30 mm. to a specific gravity of 1.250 at 50° C., then refrigerated for several days, and filtered. Once again the filtrate is concentrated under the vacuum. The concentrate is centrifuged while hot at a temperature of 60° C., and its filtrate evaporated to dryness. A solution of the residue in methanol acidified with 80% formic acid, is slowly distilled to remove the formed formic acid as methyl formate and the residual formaldehyde as methylal. Six hundred parts of additional methanol is added and the solution neutralized with sodium carbonate and filtered. When the filtrate has been evoparted to dryness a syrupy material is obtained which is then extracted with chloroform. On distillation the chloroform-solution material yields at 125–147° C./3 mm. a fraction with a methoxyl value of 20.8%, corresponding to the monomethyl ether of pentaerythritol having the formula

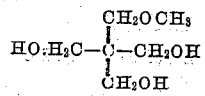

The theoretical methoxyl value for the monomethyl ether of pentaerythritol is 20.6%. The methoxyl value is determined by the usual method comprising reacting a sample with hydroiodic acid and determining the amount of methyl iodide formed.

B. A solution of 168 parts (3 moles) of potassium hydroxide in 1680 parts of methanol is cooled to 5° C. To this solution a mixture of 720 parts (9 moles) of 37% formaldehyde in methanol and 88 parts (2 moles) of acetaldehyde is added slowly, the temperature rising to 22° C. The charge is heated at 60° C. until the formaldehyde has reacted and is then neutralized with 85% formic acid in water. When the methanol has been distilled off the liquor is extracted with isopropyl ether. The material separated in this fashion from the mother liquor consists of 149.5 parts of a viscous yellow syrup with a hydroxyl value of 21.68% and a methoxyl value of 33.0%. This syrup is distilled at 5 mm. pressure to yield at 117–120° C. a fraction which amounts to approximately 60% of the original syrup and which was found by analysis to be the dimethyl ether of pentaerythritol.

Further extraction of the liquor with ethyl acetate results in the separation of 46 parts of a syrup from which is obtained by distillation at 5 mm. pressure a fraction boiling at 170–180° C. This fraction, comprising about 75% of the extracted material, is found to be the monomethyl ether of pentaerythritol.

The ethers obtained in this manner are white crystalline compounds, the dimethyl ether melting at 40–47° C. and the monomethyl ether at 60–67° C.

C. To 675 parts by weight (9 moles) of a 40% formaldehyde solution in water, containing 12% methanol, are added 594 parts of methanol and 81 parts of water to make the methanol concentration in the solution equal the formaldehyde concentration. Two moles (1230 cc.) of a 7.15% acetaldehyde solution in water and 3 moles (380 cc.) of a 31.8% sodium hydroxide solution in water are added, and the mixture is refluxed at 55° C. until the formaldehyde concentration has fallen below 0.6%. When cool, the charge is filtered and the filtrate concentrated to a specific gravity of 1.250 at 50° C. Two crops of pentaerythritol crystals are removed from the concentrate. The pentaerythritol mixed methyl esters are separated from the syrupy end liquor by methanol extraction.

D. To a solution of 3.5 moles (420 parts) of 30% caustic sodium hydroxide in water, in 8 moles (256 parts) of methanol is added 1 mole (117.2 parts) of 25.7% formaldehyde in methanol. A mixture of 2 moles (88 parts) of acetaldehyde and 9 moles (1055 parts) of the 25.7% formaldehyde in methanol is added to the above mentioned solution, and the reaction and isolation of ethers are carried out as described in Example A.

Fractionation of the chloroform-soluble material results in the separation of a fraction (B. P., 111°–135° C./3 mm.) with a methoxyl value of 30.1% and one (B. P. 135°–147° C./3 mm.) with a methoxyl value of 19.4%. The theoretical methoxyl values for the mono- and dimethyl ethers of pentaerythritol are 20.6% and 37.8% respectively. The total yield of methyl ethers is 15.0% based on the acetaldehyde used.

E. A 30% solution of paraformaldehyde (10 moles $CH_2O$) in methanol and a 20.6% solution of sodium hydroxide (3.5 moles NaOH) in methanol are prepared. One tenth of the formaldehyde solution is added to the caustic solution. The resulting hemiformal solution is stirred for 5 minutes before the remainder of the formaldehyde solution and 2 moles of acetaldehyde are added to it. The mixture is heated at 60° C. to allow the formaldehyde concentration to drop to 0.15%, neutralized with 80% formic acid in water and filtered after standing overnight. The filtrate is evaporated to dryness; then the residue is dissolved in methanol acidified with 80% formic acid and distilled to remove the formic acid and formaldehyde as methyl formate and methylal, respectively. The residue is dissolved in methanol, neutralized with sodium carbonate, and filtered hot. When the filtrate has been evaporated to dryness, the residue is distilled at 2 mm. pressure to yield at 93–110° C. a fraction with a methoxyl value of 34.0% and at 110–117° C. a fraction with a methoxyl value of 35.0%. The total yield of ethers is 29.2%, based on the acetaldehyde used.

F. A formaldehyde solution prepared by dissolving 10 moles of paraformaldehyde in 22 moles of methanol is added at 24° C. to a solution of 3.5 moles of sodium hydroxide in 17.5 moles of methanol. To this hemiformal solution is added 2 moles of acetaldehyde. The mixture is then heated at 50–55° C. until the formaldehyde concentration has fallen to 0.15%. When the charge has been neutralized with 80% formic acid in water, it is allowed to stand overnight and then filtered. The filtrate is evaporated under vacuum to dryness. The residue is dissolved in methanol acidified with 80% formic acid, and this solution is refluxed for an hour before distillation to remove the formic acid and formaldehyde as methyl formate and methylal, respectively. The residue is dissolved in methanol, neutralized with sodium carbonate, and filtered hot. Methanol is stripped from the filtrate. When the residue is fractionated at 0.4 mm. pressure, material is collected at 42°–115° C. which has a methoxy value of 33.2% and at 115–128° C. which has a methoxy value of 34.0%. A total yield of 41.7% of pentaerythritol methyl ethers is obtained, 15.7% in the first fraction and 26.0% in the second.

2. *Reaction of ethanol hemiformal with acetaldehyde*

To a hemiformal solution prepared by mixing 900 parts (9 moles) of 30% formaldehyde, 240 parts (3 moles) of 50% sodium hydroxide and 500 parts of 95% ethanol and cooled to 20° C., is added 90 parts (2 moles) acetaldehyde. The reaction is carried out at 55° C. until the formaldehyde has been consumed. After neutralization with concentrated hydrochloric acid and filtration, the filtrate is concentrated to remove two crops of pentaerythritol crystals. The end liquor is extracted with ethyl acetate and the syrup obtained fractionated under vacuum of 20 to 30 mm. to give mixtures of the mono- and diethyl ethers of pentaerythritol as indicated by hydroxyl values ranging from 22 to 28%. The theoretical values are 31.1% for the monoether and 17.7% for the diether.

3. *Reaction of n-propanol hemiformal with acetaldehyde*

Solutions of 300 parts (10 moles of $CH_2O$) of paraformaldehyde in 1500 parts of n-propyl alcohol and 140 parts (3 moles) of sodium hydroxide in 2000 parts of n-propyl alcohol are prepared. Two moles (88 parts) of acetaldehyde is added to 90% of the hemiformal solution at 15–20° C., and this mixture added slowly to the caustic solution to which the remaining 10% of the hemiformal solution has been added. The reaction mixture is heated at 55° C. until its formaldehyde concentration has fallen to 0.1%, neutralized with concentrated hydrochloric acid, allowed to stand overnight and filtered. The filtrate is distilled to remove the excess alcohol. Methanol acidified with concentrated hydrochloric acid is added to the residue, and the solution is distilled to remove the remaining formaldehyde as methylal. Additional methanol is added, and the solution neutralized with sodium carbonate. The precipitated salts are filtered out. Then methanol is stripped from the filtrate by distillation, and the residue fractionated at approximately 0.7 mm. pressure. The material collected at 122–127° C. is found to be the di-n-propyl ether of pentaerythritol and to have a molecular weight of 198 and a hydroxyl value of 15.6% as compared to the theoretical values of 220 and 15.5, respectively, for the di-n-propyl ether of pentaerythritol.

When the residue from this fractionation has been acetylated, and the product cooled, filtered and stripped of excess acid, it is distilled at 0.5 mm. pressure to yield a fraction with a boiling range of 132–136° C., a saponification number of 9.96 ml. N/1 NaOH/g., and a molecular weight of 273. These values indicate that this fraction is composed essentially of pentaerythritol mono-n-propyl ether triacetate.

4. *Reaction of isopropyl hemiformal with acetaldehyde*

Nine hundred parts (9 moles) of 30% formaldehyde in 240 parts (3 moles) of 50% sodium hydroxide, and 500 parts of isopropanol are mixed and the mixture cooled to 20° C. To this hemiformal solution is added 90 parts (2 moles) of acetaldehyde. The batch is heated at 60° C. until virtually all of the formaldehyde has been reacted. After neutralization with concentrated hydrochloric acid, concentration, and removal of the precipitated pentaerythritol by filtration, the filtrate is distilled at 155 to 200° C. and 1.3 mm. to give fractions evidently made up of the mixed mono- and diisopropyl ethers of pentaerythritol. The hydroxyl values of these fractions range from 23.9 to 27.4%.

5. Reaction of n-butyl hemiformal with acetaldehyde

The hemiformal of n-butanol, prepared by mixture 900 parts (9 moles) of 30% formaldehyde in n-butanol, 240 parts (3 moles) of 50% sodium hydroxide in water, and 500 parts of n-butanol, is cooled at 20° C. and 90 parts (2 moles) of acetaldehyde is added to it. After the usual heating at 55° C. and the neutralization with concentrated hydrochloric acid, concentration and filtration steps, the end liquor is extracted with ethyl acetate. The syrup recovered when vacuum distilled at 1.5 mm. yields fractions, evidently mixtures of the monobutyl and dibutyl ethers of pentaerythritol, which have hydroxyl values of approximately 24%.

6. Reaction of tertiary-butanol hemiformal with acetaldehyde

Three hundred parts by weight (10 moles of $CH_2O$) of paraformaldehyde and 140 parts (3.5 moles) of sodium hydroxide are each dissolved in 2500 part portions of tertiary butanol. Ten percent of the hemiformal solution is added to the caustic solution at 24° C. A mixture of the remainder of the hemiformal solution and 88 parts (2 moles) of acetaldehyde is added in an hour to the caustic solution. The reaction mixture is heated at 55° C. until the formaldehyde concentration has fallen to 0.3%. When the solution has been neutralized and filtered, the excess alcohol is removed by distillation under reduced pressure of 20–30 mm. Methanol acidified with concentrated hydrochloric acid is added to the residue, and the resulting solution distilled to remove the remaining formaldehyde as methylal. The residue is refluxed for six hours with acetic anhydride, after which the excess acid is removed by distillation and the pentaerythritol tetraacetate by filtration. The filtrate is vacuum distilled at 0.5 mm. pressure to yield fractions boiling between 121° C. and 183° C., which evidently contain mixtures of the pentaerythritol tertiary butyl ether acetates.

7. Reaction of n-amyl alcohol hemiformal with acetaldehyde

Ten per cent of a solution of 300 parts by weight (10 moles of $CH_2O$) of paraformaldehyde in 815 parts by weight of n-amyl alcohol is added to a solution of 140 parts (3.5 moles) of sodium hydroxide in 1430 parts of n-amyl alcohol at 23° C. The remainder of the formaldehyde and 88 parts (2 moles) of acetaldehyde are mixed and added slowly to the caustic solution. The charge is allowed to stand at room temperature for 24 hours and is then heated at 55° C. until the formaldehyde concentration has fallen at 0.15%. After neutralization with hydrochloric acid and filtration, the solution is stripped of excess amyl alcohol by distillation. Thirty-five hundred parts of methanol and 25 parts of hydrochloric acid are added to the residue, and the solution distilled at 50° C. slowly to remove the remaining formaldehyde as methylal. When the residue has been acetylated with acetic anhydride, the excess acid is removed by distillation and the precipitated pentaerythritol tetraacetate, by filtration. The filtrate is distilled at 0.6 mm. pressure to yield at 155–158° C. a fraction with a saponification value of 9.0 ml. N/1 NaOH/g. and a molecular weight of 284 indicating pentaerythritol mono-n-amyl ether triacetate, as compared to theoretical values of 9.0 and 332, respectively, for pentaerythritol mono-n-amyl ether triacetate.

8. Reaction of the ethylene glycol hemiformal with acetaldehyde

To 900 parts (9 moles) of 30% formaldehyde at 0° C. are added 240 parts (3 moles) of 50% caustic soda and 500 parts of ethylene glycol. The temperature is held at 0° C. while 15 parts of acetaldehyde is added. The reaction mixture is warmed to 15° C., and an additional 75 parts of acetaldehyde is added to bring the amount of acetaldehyde used to 2 moles. The charge is heated at 60° C. to lower the formaldehyde concentration to 0.3% and is then filtered. The filtrate is extracted with ethyl acetate. The acetate-soluble material is fractionated under a vacuum of 1 mm. to give hydroxyethyl ether mixtures having hydroxyl values of from 22.4% to 29.9%. The theoretical values for the mono- and dihydroxyethyl ethers thus produced are 37.8% and 31.6%, respectively.

9. Reaction of glycerol hemiformal with acetaldehyde

To a mixture of 500 parts of glycerol and 900 parts (9 moles) of 30% formaldehyde at 15° C. is added 240 parts (3 moles) of 50% caustic soda. The temperature is held between 15° and 20° C. while 90 parts (2 moles) of acetaldehyde is slowly added to the hemiformal solution. After standing at room temperature for 2 hours, the mixture is heated at 58° C. until most of the formaldehyde has been consumed, then neutralized with concentrated hydrochloric acid, concentrated and filtered. The filtrate is extracted with ethyl acetate. On fractionation of the extracted material mixtures of the glycerol ethers of pentaerythritol are obtained which have hydroxyl values ranging from 24.0 to 38.6%.

10. Reaction of methanol hemiformal with propionaldehyde

To a solution of 140 parts (3.5 moles) of sodium hydroxide in 600 parts of methanol is added at 20–25° C. 10% of a solution of 300 parts (10 moles $CH_2O$) of paraformaldehyde in 900 parts of methanol. Two moles of propionaldehyde is added to the remainder of the formaldehyde solution at 15–20° C. The latter solution is added, with good agitation, to the hemiformal solution over a period of one hour. During this time a temperature of 20–25° C. is maintained. The reaction mixture is heated at 55° C. until the formaldehyde content has fallen below 0.3%, neutralized with concentrated hydrochloric acid to the Congo red endpoint, and filtered. The filtrate is stripped of alcohol under a reduced pressure of 20–30 mm. The residue, dissolved in methanol acidified with concentrated hydrochloric acid, is distilled slowly to remove the formaldehyde as methylal. When dry the material is taken up in methanol, neutralized with sodium carbonate and filtered. After the methanol has been removed, the residue is vacuum distilled at 84–92° C. and 1 mm. The fraction collected at 86–92° C./1 mm. is found to be composed chiefly of the monomethyl ether of trimethylolethane. It has a hydroxyl value of 23.7%, methoxyl value of 21.9%, and molecular weight of 126. The theoretical values for the timethylalethane monomethyl ether are 25.4%, 23.1% and 134, respectively.

11. Reaction of methanol hemiformal with isobutyraldehyde

To a solution of sodium hydroxide (140 parts, 3.5 moles) in methanol (600 parts) is added 10% of a solution of paraformaldehyde (300 parts, 10 moles of $CH_2O$) in methanol (900 parts) at a temperature of 20–25° C. The remainder of the formaldehyde solution and 2 moles of isobutyraldehyde are added with stirring to the hemiformal solution. The reaction mixture is refluxed at 55° C. until the concentration of formaldehyde has fallen below 0.3%, then neutralized with concentrated hydrochloric acid and filtered. The excess alcohol is distilled off under reduced pressure of 20–30 mm. A methanol solution, acidified with concentrated hydrochloric acid, of the residue is distilled to remove the remaining formaldehyde as methylal. When dry the residue is dissolved in methanol neutralized with sodium carbonate, and filtered. The filtrate is stripped of methanol by distillation and the residue distilled at 0.5 mm. pressure. The material collected from distillation between 90° to 104° C. is recrystallized from benzene. The filtrate from the recrystallization is distilled under reduced pressure of 0.5 mm. to give a product which proved, on analysis, to be a mixture of pentaglycol monomethyl ether and pentaglycol.

12. Reaction of allyl alcohol hemiformal with acetaldehyde

To a mixture of 116 parts by weight (2 moles) of allyl alcohol and 140 parts by weight (3.5 moles) of sodium hydroxide is added one mole of 25.6% formaldehyde. Two moles of acetaldehyde and 9 moles of formaldehyde are mixed at 10° C. and added to this caustic solution. The mixture is heated at 48° C. until the formaldehyde concentration has dropped to 0.03%. After neutralization with formic acid and filtration, the filtrate is concentrated to precipitate out the pentaerythritol and sodium formate. The filtrate is evaporated under vacuum to dryness. The residue is dissolved in methanol acidified with concentrated hydrochloric acid and the solution distilled slowly to remove the formic acid as methyl formate and the formaldehyde as methylal. Seventy-five parts of additional methanol is added, and the solution is neutralized with sodium carbonate and filtered. When the alcohol has been stripped from it by distillation, the filtrate is distilled at 3 mm. pressure to give, at 131–140° C., a fraction with a hydroxyl value of 23.3% and an iodine number of 119.7 g. $I_2$/100 g. This fraction evidently contained a mixture of pentaerythritol allyl ethers.

13. Reaction of triethanolamine hemiformal with acetaldehyde

To a solution of 1 mole (149.2 parts by weight) of triethanolamine in 1.75 moles (228.5 parts by weight) of 30% NaOH at 15–20° C. is added 0.5 (60 parts by weight) of 25% formaldehyde. An additional 4.5 moles (540 parts) of 25% formaldehyde in water is added to 1 mole (44 parts) of acetaldehyde at 15–20° C. The latter solution is added to the triethanolamine hemiformal solution at 25–30° C. over a period of 30 minutes. The resulting mixture, which is yellow in color, is heated at 60° C. until its formaldehyde concentration has fallen to about 0.8%. Then the mixture is neutralized with hydrochloric acid and filtered. The filtrate is allowed to stand overnight and is then filtered. The precipitate, which is recrystallized twice from water, is evidently the hydrochloride of the triethanolamine monoether of pentaerythritol. It melts at 142–144° C. and contains 12.6% Cl as compared to a theoretical 13.4% for this compound.

The combined filtrates from the above mentioned crystallizations are evaporated to dryness. The residue is dissolved in ethanol and refluxed an hour; then the solution is cooled to room temperature and filtered. The residue, which melts at approximately 240° C., evidently consists of a mixture of sodium formate and sodium chloride. The filtrate is evaporated to dryness, refluxed with ethanol until all the crystalline material has dissolved, refrigerated for four hours, and filtered to give a filtrate (A) and a residue (B). Filtrate (A) is then saturated with HCl and on filtration yields a material, evidently triethanolamine hydrochloride, which melts at 173–175° C. The filtrate, when dried, has a hydroxyl value of 20.3%. This is probably a mixture of the mono- and ditriethanolamine ethers of pentaerythritol.

The residue (B) is refluxed with methanol and filtered. The filtrate is cooled overnight and again filtered. The residue, which melted at 145–150° C. and contained 9.1% free chlorine, is evidently the hydrochloride of the monotriethanolamine ether of pentaerythritol.

14. Starch ethers of pentaerythritol

To a mixture of 180 grams of soluble starch and 233 grams (1.75 moles) of 30% NaOH in water is added, with stirring, 50 grams of 25% formaldehyde in water at 15–20° C. Water is added to the mixture when necessary to thin to a stirrable consistency the gel formed. During the course of the reaction approximately 500 ml. of water is added.

Over a period of 30 minutes a mixture of 540 grams (4.5 moles) of 25% of formaldehyde in water and 44 grams (1 mole) of acetaldehyde at 15–20° C. is added to the starch-NaOH-formaldehyde mixture. During the addition of the aldehydes the temperature is held between 25° and 30° C. When the aldehydes have been added, the reaction mixture is heated at 60° C. until it carmelizes slightly. It is then neutralized with 94 cc. of 91.2% formic acid in water. At this point the mixture contains less than 0.1% formaldehyde. It is then refluxed for 8 hours with 75 cc. of concentrated hydrochloric acid.

With stirring, 84 grams of 50% caustic soda is added, neutralizing to a pH of about 6. The mixture is then filtered. The filtrate is evaporated to dryness under reduced pressure, and the residue dried at 80° C. Analytical data indicate that this residue is a mixture of the starch ether of pentaerythritol, pentaerythritol, sodium chloride and sodium formate.

15. Methyl cellulose ethers of pentaerythritol

A 10% solution of methyl cellulose is prepared by mixing 66.6 grams of methyl cellulose with 300 grams of boiling water, cooling the mixture to room temperature, adding to it 300 grams of cold water, and stirring it for 2 hours. The resulting thick mixture is passed through a Waring Blendor to convert it to a creamy foam. When 1.75 moles (233 grams) of 30% NaOH in water at 15–20° C. is added to it, this foam is changed to a jelly-like semi-solid. One-half mole of formaldehyde is added at 15–20° C. A mixture of 540 grams (4.5 moles) of 25% formaldehyde in water and 44 grams (1 mole) of acetaldehyde is added, with good stirring, to the methyl cellulose mixture described above. The addition takes place over a period of 30 minutes. During this time the temperature of the mixture is held at 30–35° C. After being heated at 55–60° C. for about 11¼ hours to lower the formaldehyde concentration to 0.3%, the mixture is neutralized with 9.6 cc. of 91% formic acid in water and filtered. The residue, a cloudy white gelatinous material, is dried overnight at 100° C. The filterate is evaporated to dryness, and its residue combined with the previously dried material. This material contains the mixed methyl cellulose ethers of pentaerythritol.

16. *Acetone condensation with formaldehyde and methanol*

A hemiformal solution is prepared by dissolving 480 grams (16 moles) of paraformaldehyde in 1000 grams of methanol. Two moles (116 grams) of acetone is dissolved at 15–20° C. in 90% of this solution. To the remainder of this solution is added, at 15–20° C., a solution of 3.5 moles (140 grams) of NaOH in 600 grams of methanol. The acetone-formaldehyde solution is added to the caustic-formaldehyde solution at 35–45° C. over a period of an hour. The mixture is heated at 50–55° C. until the concentration of formaldehyde has fallen below 0.3%. After neutralization to pH 6 with 97 cc. of concentrated hydrochloric acid, the material is allowed to stand overnight and is then filtered. The residue which is washed with methanol and dried at 100–105° C., is found to consist mainly of sodium chloride. Methanol is stripped by distillation under reduced pressure of 20–30 mm. from the filtrate. The residue is refluxed with chloroform, and the solution filtered. The crystalline material collected is a mixture of inorganic salts. The filtrate, which contains an insoluble oily layer, is cooled overnight and then filtered to remove a small amount of tar and low melting crystalline material. When the chloroform has been evaporated from it, a residue is obtained, the methoxyl and hydroxyl values of which indicate that it is evidently a mixture of hydroxyl-methyl methoxy-methyl derivatives of acetone.

It is evident that any carbonyl compound, by which I mean herein and in the appended claims any aldehyde or ketone having an alpha carbon atom to which is attached an active hydrogen atom and will react under alkaline conditions with hemiformals.

It has been shown that the maximum yields of the ethers are obtained when the reaction is run under anhydrous conditions.

The mixtures of mono- and diethers which generally result from this reaction can in most instances be separated by a simple distillation step.

While I have described my invention above in detail I wish it to be understood that many changes may be made therein without departing from the spirit of the same.

I claim:

1. A process for preparing a polyhydric alcohol methoxyl compound which comprises reacting in an alkaline medium and in the absence of water, a mixture containing an aldehyde selected from the group consisting of formaldehyde and paraformaldehyde, and a lower aliphatic alcohol together with a lower aliphatic saturated aldehyde containing a replaceable hydrogen atom linked to the carbonyl group.

2. A process for preparing a polyhydric alcohol ether which comprises reacting in an alkaline medium and in the absence of water, a mixture containing an aldehyde selected from the group consisting of formaldehyde and paraformaldehyde, and a lower aliphatic alcohol together with a lower aliphatic saturated aldehyde containing a replaceable hydrogen atom linked to the carbonyl group.

3. A process for preparing a polyhydric alcohol ether which comprises reacting in an alkaline medium and in the absence of water, a mixture containing an aldehyde selected from the group consisting of formaldehyde and paraformaldehyde, and methyl alcohol together with a lower aliphatic saturated aldehyde containing a replaceable hydrogen atom linked to the carbonyl group.

4. A process for preparing a polyhydric alcohol ether which comprises reacting in an alkaline medium and in the absence of water, a mixture containing an aldehyde selected from the group consisting of formaldehyde and paraformaldehyde, and propyl alcohol together with a lower aliphatic saturated aldehyde containing a replaceable hydrogen atom linked to the carbonyl group.

5. A process for preparing a polyhydric alcohol ether which comprises reacting in an alkaline medium and in the absence of water, a mixture containing an aldehyde selected from the group consisting of formaldehyde and paraformaldehyde, and butyl alcohol together with a lower aliphatic saturated aldehyde containing a replaceable hydrogen atom linked to the carbonyl group.

6. A process for preparing a polyhydric alcohol ether which comprises reacting in an alkaline medium and in the absence of water, a mixture containing an aldehyde selected from the group consisting of formaldehyde and paraformaldehyde, and amyl alcohol together with a lower aliphatic saturated aldehyde containing a replaceable hydrogen atom linked to the carbonyl group.

7. A process for preparing a pentaerythritol methyl ether which comprises reacting in an alkaline medium and in the absence of water, a mixture containing an aldehyde selected from the group consisting of formaldehyde and paraformaldehyde, and methyl alcohol together with acetaldehyde, neutralizing the reaction product thereby obtained, filtering, concentrating the filtrate, and then removing the impurities therefrom.

8. A process for preparing a propyl ether of pentaerythritol which comprises reacting in an alkaline medium and in the absence of water, a mixture containing an aldehyde selected from the group consisting of formaldehyde and paraformaldehyde, and propyl alcohol together with acetaldehyde, neutralizing the reaction product thereby obtained, filtering, concentrating the filtrate, and then removing the impurities therefrom.

9. A process for preparing a butyl ether of pentaerythritol which comprises reacting in an alkaline medium and in the absence of water, a mixture containing an aldehyde selected from the group consisting of formaldehyde and paraformaldehyde, and butyl alcohol together with acetaldehyde, neutralizing the reaction product thereby obtained, filtering, concentrating the filtrate, and then removing the impurities therefrom.

10. A process for preparing an amyl ether of pentaerythritol which comprises reacting in an alkaline medium and in the absence of water, a mixture containing an aldehyde selected from the group consisting of formaldehyde and paraformaldehyde, and amyl alcohol together with acetaldehyde, neutralizing the reaction product thereby obtained, filtering, concentrating the filtrate, and then removing the impurities therefrom.

11. A process for preparing a methyl ether of trimethylol-ethane which comprises reacting in an alkaline medium and in the absence of water, a mixture containing an aldehyde selected from the group consisting of formaldehyde and paraformaldehyde, and methyl alcohol together with propionaldehyde, neutralizing the reaction product thereby obtained, filtering, concentrating the filtrate, and then removing the impurities therefrom.

12. A process for preparing a methyl ether of pentaglycol which comprises reacting in an alkaline medium and in the absence of water, a mixture containing an aldehyde selected from the group consisting of formaldehyde and paraformaldehyde, and methyl alcohol together with butyraldehyde, neutralizing the reaction product thereby obtained, filtering, concentrating the filtrate, and then removing the impurities therefrom.

13. A process for preparing a polyhydric alcohol ether which comprises reacting in an alkaline medium and in the absence of water, a mixture containing an aldehyde selected from the group consisting of formaldehyde and paraformaldehyde and a lower aliphatic alcohol together with acetaldehyde.

14. A process for preparing a polyhydric alcohol ether which comprises reacting in an alkaline medium and in the absence of water, a mixture containing an aldehyde selected from the group consisting of formaldehyde and paraformaldehyde and a lower aliphatic alcohol together with propionaldehyde.

15. A process for preparing a polyhydric alcohol ether which comprises reacting in an alkaline medium and in the absence of water, a mixture containing an aldehyde selected from the group consisting of formaldehyde and paraformaldehyde and a lower aliphatic alcohol together with butyraldehyde.

ROBERT H. BARTH.

References Cited in the file of this patent

UNITED STATES PATENTS

| Number | Name | Date |
|---|---|---|
| 1,774,500 | Burke | Sept. 2, 1930 |
| 1,878,040 | Voss | Sept. 20, 1932 |
| 2,170,624 | Wyler | Aug. 22, 1939 |
| 2,333,696 | Bludworth | Nov. 9, 1943 |
| 2,418,290 | Bruson | Apr. 1, 1947 |
| 2,483,739 | Roach et al. | Oct. 4, 1949 |

OTHER REFERENCES

Walker, "Formaldehyde," (1944), pp. 138–40, Reinhold, publishers.